(12) United States Patent
Shimizu

(10) Patent No.: US 8,559,892 B2
(45) Date of Patent: Oct. 15, 2013

(54) INFORMATION COMMUNICATION SYSTEM, INFORMATION PROCESSING APPARATUS, AND OPERATING TERMINAL

(75) Inventor: Takanori Shimizu, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 703 days.

(21) Appl. No.: 12/066,870

(22) PCT Filed: Sep. 7, 2006

(86) PCT No.: PCT/JP2006/317731
§ 371 (c)(1),
(2), (4) Date: May 6, 2008

(87) PCT Pub. No.: WO2007/032248
PCT Pub. Date: Mar. 22, 2007

(65) Prior Publication Data
US 2009/0156136 A1    Jun. 18, 2009

(30) Foreign Application Priority Data
Sep. 15, 2005  (JP) ................................. 2005-269288

(51) Int. Cl.
*H04B 1/40* (2006.01)
*H04B 7/00* (2006.01)
*H04B 15/00* (2006.01)

(52) U.S. Cl.
USPC ........................... 455/74.1; 455/502; 455/508

(58) Field of Classification Search
None
See application file for complete search history.

(56) References Cited

U.S. PATENT DOCUMENTS

| | | | | |
|---|---|---|---|---|
| 4,903,322 A | * | 2/1990 | Inahara et al. | 455/514 |
| 5,766,077 A | * | 6/1998 | Hongo | 463/30 |
| 6,067,452 A | * | 5/2000 | Alexander | 455/428 |
| 6,163,693 A | * | 12/2000 | Rydbeck | 455/418 |
| 6,254,477 B1 | | 7/2001 | Sasaki et al. | |

(Continued)

FOREIGN PATENT DOCUMENTS

| | | | |
|---|---|---|---|
| EP | 1 559 460 | | 8/2005 |
| EP | 1 662 413 | | 5/2006 |
| JP | 2002126310 A | * | 5/2002 |
| WO | 2002/036226 A1 | | 5/2002 |

OTHER PUBLICATIONS

International Search Report dated Dec. 12, 2006 from the corresponding PCT/JP06/317731.

(Continued)

*Primary Examiner* — Yuwen Pan
*Assistant Examiner* — Ayodeji Ayotunde
(74) *Attorney, Agent, or Firm* — Katten Muchin Rosenman LLP

(57) ABSTRACT

A controller 20 transmits a unique ID to a console main unit 10 when starting communication with said console main unit 10. The console main unit 10 determines whether the received unique ID has already been registered in a wired controller No. registration table, and when it has already been registered, sets already registered correspondence for corresponding a virtual controller No., a wired controller No., and the unique ID. Otherwise, if it is not yet registered, a wired controller No. and the unique ID are corresponded, and new registration and correspondence setting for corresponding them to a virtual controller No. is conducted. The virtual controller No. corresponded to the unique ID is associated to predetermined information processing if the already registered correspondence setting or new registration and correspondence setting is completed.

7 Claims, 12 Drawing Sheets

(56) References Cited

U.S. PATENT DOCUMENTS

| | | | |
|---|---|---|---|
| 6,342,010 B1* | 1/2002 | Slifer | 463/39 |
| 6,684,062 B1* | 1/2004 | Gosior et al. | 455/73 |
| 6,832,372 B1* | 12/2004 | Frye et al. | 717/168 |
| 2002/0032786 A1* | 3/2002 | Yamada et al. | 709/230 |
| 2002/0072410 A1* | 6/2002 | Tanaka et al. | 463/37 |
| 2002/0098889 A1 | 7/2002 | Sato | |
| 2004/0235420 A1 | 11/2004 | Miyazaki | |
| 2005/0170889 A1* | 8/2005 | Lum et al. | 463/39 |
| 2006/0068785 A1* | 3/2006 | Kamijo et al. | 455/435.1 |
| 2007/0245338 A1* | 10/2007 | Musha | 717/173 |
| 2008/0114912 A1* | 5/2008 | Shimizu | 710/106 |

OTHER PUBLICATIONS

European Search Report dated Dec. 9, 2011, from corresponding European Application No. 06 79 7607.

* cited by examiner

FIG. 5

WIRED CONTROLLER NO. REGISTRATION TABLE

| WIRED CONTORLLER NO. | UNIQUE ID |
|---|---|
| W - 01 | C - 02 |
| W - 02 | C - 03 |
| W - 03 | C - 04 |
| W - 04 | C - 01 |
|  |  |
|  |  |

FIG. 6

WIRELESS CONTROLLER NO. REGISTRATION TABLE

| WIRELESS CONTROLLER NO. | UNIQUE ID |
|---|---|
| R - 01 | C - 03 |
| R - 02 | C - 02 |
| R - 03 | C - 01 |
| (R - 04) | (C - 04) |
|  |  |
|  |  |

FIG. 7

VIRTUAL CONTROLLER NO. CORRESPONDENCE TABLE

| VIRTUAL CONTROLLER NO. | COLOR | PHYSICAL CONTROLLER NO. | | UNIQUE ID |
|---|---|---|---|---|
| | | WIRED CONTROLLER NO. | WIRELESS CONTROLLER NO. | |
| V - 01 | RED | W - 01 | R - 02 | C - 02 |
| V - 02 | YELLOW | W - 02 | R - 01 | C - 03 |
| V - 03 | BLUE | W - 03 | (R - 04) | C - 04 |
| V - 04 | BLACK | W - 04 | R - 03 | C - 01 |
| V - 05 | WHITE | | | |
| ...... | ...... | | | |

INFORMATION COMMUNICATION SYSTEM, INFORMATION PROCESSING APPARATUS, AND OPERATING TERMINAL

TECHNICAL FIELD

The present invention relates to an information and telecommunications system, which is constituted by multiple operation terminals and an information processing unit, such as an entertainment system including a video game console and multiple controllers, an information processing unit such as a video game console, an operation terminal such as a controller for a video game console, a processing program to be executed for these operations, and a storage medium stored with the processing program.

BACKGROUND ART

For example, with a video game console including controller ports to which multiple controllers is connectable, many gamers (hereafter referred to as players) may enjoy the same game by operating the respective controllers.

In the case of many players playing a game by operating respective controllers, correspondences of characters in the game shown on a display screen such as a television monitor and the controllers for manipulating those characters are set by the players themselves operating the controllers.

Note that those that are manipulated during the game using the controllers are not limited to characters, nor are what are corresponded with the controllers limited to the characters; however, characters are given as an example here for simplification of description.

In the case of a conventional video game console, controllers are connected to controller ports of the game console main unit one-to-one via cables, and the game console main unit corresponds port numbers attached to the respective controller ports to the respective characters in conformity with input by the players. For example, in the case of setting so as to manipulate a first character using a first controller connected to a first controller port (port number 01), and setting so as to manipulate a second character using a second controller connected to a second controller port (port number 02), the game console main unit corresponds the first character to the port number 01, and the second character to the port number 02. In other words, controller-to-character correspondence is set via the port numbers.

DISCLOSURE OF INVENTION

Problem to be Solved by the Invention

However, when connecting the controllers and the video game console through wireless communication, a controller cannot be specified by controller-to-port number correspondence, and new correspondences must be set in order to specify the controllers.

Furthermore, when connection between the controllers and the video game console is possible using both wired and wireless methods, the connection may be changed (changed from wired to wireless, or from wireless to wired) while the game is in execution without changing the controllers. In such cases, it is not favorable that progression of the game is interrupted due to change in the communication status.

Moreover, setting correspondences between the controllers and the video game console every time a game starts results in an inconvenience of increase in processing burden on the video game console and preparation time to start the game.

The present invention is created with consideration for the above-described problems, and aims to provide an information and telecommunications system, which includes an information processing unit to which multiple operation terminals are connectable, and operation terminals, such as an entertainment system including multiple controllers and a video game console to which multiple controllers is connectable; wherein said information and telecommunications system is capable of corresponding them regardless of a wired and wireless connection; an information processing unit; operation terminals; an information processing program to be executed for operations thereof; and a storage medium stored with the processing program.

Means of Solving the Problem

An information and telecommunications system of the present invention includes an operation terminal operated by a user, and an information processing unit, which allows communication with the operation terminal.

The operation terminal has a terminal transmitting means and a terminal side identification information storage means. The terminal side transmitting means transmits and receives information to/from the information processing unit. The terminal side identification information storage means is pre-stored with unique terminal identification information.

The information processing unit has an information processing execution means, a console side transmitting means, a console side terminal identification information storage means, a correspondence setting means, and a correspondence storage means.

The information processing execution means executes predetermined information processing. The console side transmitting means transmits and receives information to/from the operation terminal. The console side terminal identification information storage means is stored with terminal identification information. The correspondence setting means corresponds one of multiple virtual terminal numbers to the terminal identification information received by the console side transmitting means, and associates the one virtual terminal number corresponded to the terminal identification information to a predetermined information processing. The correspondence storage means is stored with correspondence between the terminal identification information and the virtual terminal number.

The terminal side transmitting means transmits the terminal identification information stored in the terminal side terminal identification information storage means to the console side transmission means when starting communication with the console side transmission means.

The correspondence setting means determines whether the terminal identification information received by the console side transmitting means is stored in the console side terminal identification information storage means. As a result of the determination, when it has already been stored, the one virtual terminal number is corresponded to the terminal identification information. On the other hand, when it is not yet stored, the received terminal identification information is stored in the console side terminal identification information storage means and the one virtual terminal number is then corresponded to the terminal identification information. The one virtual terminal number corresponded to the terminal identification information is then associated to a predetermined information processing.

Effects of Invention

According to the present invention, since correspondence between the information processing unit and the operation terminal is set by corresponding the virtual terminal number and the terminal identification information, correspondence of both of them is possible irrespective of wired or wireless connection.

BRIEF DESCRIPTION OF DRAWINGS

FIG. 5 is a diagram schematically showing a wired controller No. registration table;

FIG. 6 is a diagram schematically showing a wireless controller No. registration table;

FIG. 7 is a diagram schematically showing a virtual controller No. correspondence table;

DESCRIPTION OF REFERENCE NUMERALS

10: console main unit
20: controllers
21: display units
64: main CPU
65: main memory

BEST MODE FOR CARRYING OUT THE INVENTION

[General Structure of the Embodiment]

Figure 1:
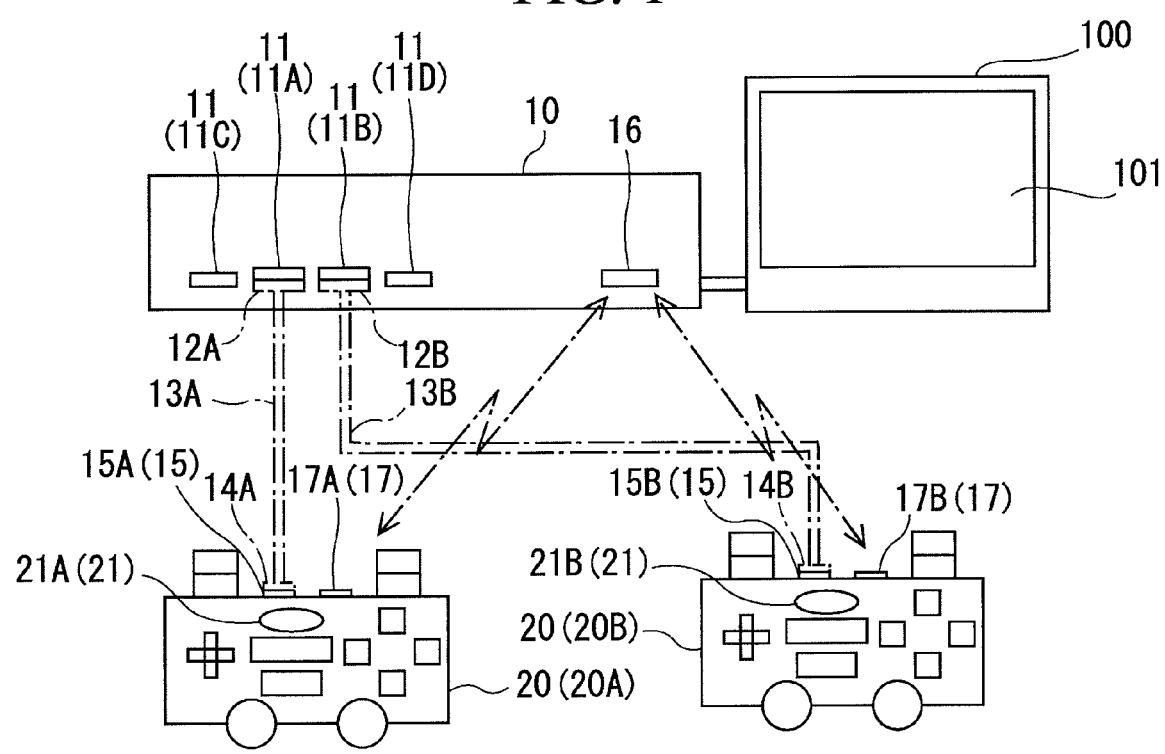
FIG. 1 is a diagram schematically showing an entertainment system of an embodiment of the present invention.

An entertainment system according to an embodiment of the present invention shown in FIG. 1 includes an entertainment console (hereafter referred to as console main unit) 10, which is an exemplary video game console of an information processing unit according to the present invention, and controllers 20 (two controllers 20A and 20B in the example of FIG. 1), which are multiple operation terminals operated by users (players). Information is transmitted and received through communication between the console main unit 10 and the respective controllers 20A and 20B. The players may arbitrarily select either communication therebetween by a wired connection via cables 13A and 13B or by a wireless connection. Furthermore, when a wired connection is established between the console main unit 10 and the respective controllers 20, wired communication is conducted and wireless communication is not.

In the example of FIG. 1, the console main unit 10 has multiple controller ports 11 (four ports 11A, 11B, 11C, and 11D in this embodiment). For wirelessly connecting the respective controllers 20A and 20B and the console main unit 10, the cable 13A has a plug-in connector 12A provided on an end inserted into an arbitrary one of the controller ports 11 (11A in this example) of the console main unit 10 and electrically connected, and a plug-in connector 14A provided on the other end is inserted into a connection port 15 (15A) of the controller 20A and electrically connected. Furthermore, the cable 13B has a plug-in connector 12B provided on an end inserted into an arbitrary one (11B) of the controller ports 11 of the console main unit 10 and electrically connected, and a plug-in connector 14B provided on the other end is inserted into a connection port 15 (15B) of the controller 20B and electrically connected. The wired connection method used between the console main unit 10 and the controllers 20 should allow two-way communications, and a universal serial bus (USB) connection is adopted in this embodiment.

Furthermore, the respective controllers 20 (20A and 20B) are provided with respective communication units (antennas) 17 (17A and 17B) for sending and receiving information through wireless communication between the console main unit 10 and wireless communication units (antennas) 16. There are various communication methods applicable between the wireless communication units 16 and 17 such as a general purpose short-range, high-speed wireless communication method such as Bluetooth™ or an exclusive short-range, wireless communication method as long as two-way wireless communication is possible therebetween. Bluetooth™ wireless communication (hereafter referred to as BT communication) is adopted in this embodiment.

A detailed configuration of the exterior of the controllers 20 (20A and 20B) is to be hereafter described, but display units 21 (21A and 21B) are provided to the respective controllers 20A and 20B in positions easily visible for the players. These display units 21A and 21B are liquid crystal display panels, organic or inorganic electroluminescence (EL) panels, segment displays, or light-emitting diodes (LEDs) that the players can see; this embodiment uses segment displays or LEDs (omitted from the drawings).

The respective display units 21A and 21B according to this embodiment have segment displays that can display numeric data or multi-color LEDs (hereafter simply referred to as LEDs) capable of emitting different colored lights. In the case of segment displays, virtual controller numbers (to be hereafter described in detail) assigned to respective controllers 20 by the console main unit 10 are displayed as correspondence information representing correspondences of the controllers 20 to the respective game characters. In the case of LEDs, they light in colors corresponding to the respective virtual controller numbers.

Furthermore, when configuring the display units without the segment displays and LEDs, the correspondence information representing the correspondences of the controllers 20 and the game characters set by the console main unit 10 includes design, symbols and the like for identifying each of the controllers, or design, symbols and the like for symbolizing the characters, for example, in the game that can be manipulated by each of the controllers and that are assigned to the respective controllers 20 and transmitted. Note that design for symbolizing the characters includes design of the characters themselves or abstract design of the characters.

In other words, display on the display units 21A and 21B should at least allow the players to directly or indirectly visually recognize the virtual controller numbers assigned to the respective controllers 20A and 20B by the console main unit 10.

It is easy for the players to confirm from such display on the display units 21A and 21B of the respective controllers 20A and 20B, which of the characters in the game can be manipulated using the hand-held controllers 20A and 20B.

[Overall Structure of Entertainment System]

The entertainment system shown in FIG. 1 is constituted by the console main unit 10, the controllers 20 (20A and 20B), and a monitor device (e.g., television receiver) 100 to which images and audio signals are supplied from the console main unit 10. The monitor device 100 has an image display unit 101 for displaying the images based on the audio signals supplied from the console main unit 10.

[Exterior of Console Main Unit]

In addition to the above-mentioned controller ports 11 (11A to 11D) and the wireless communication units 16, the console main unit 10 is provided with a memory card slot in which a memory card may be inserted/ejected, a disk tray, an open/close button for opening and closing the disk tray, an on/standby/reset button for turning power on, entering standby mode, or resetting, an audio-video output terminal (AV multi-output terminal), a PC card slot, an optical digital output terminal, an IEEE (Institute of Electrical and Electronics Engineers) 1394 connection terminal, a power switch, and an AC power input terminal not shown in the drawing.

The console main unit 10 is capable of executing a video game based on an application program for the video game recorded on a disk medium such as a DVD-ROM or CD-ROM, for example, and reproducing (decoding) video data and audio data recorded on a DVD or CD. Furthermore, when the application program includes a controller connection management program to be hereafter described, the console main unit 10 controls so as to transmit the virtual controller numbers (Nos.) to be hereafter described and the like to the controllers 20 under the control of that program.

Note that the above-mentioned application program and video/audio data are read from not only disk media but also from semiconductor memory and tape media. It may also be supplied from a wired or wireless wide-area or intra-area communication line.

[Exterior of Controller]

Figure 2:
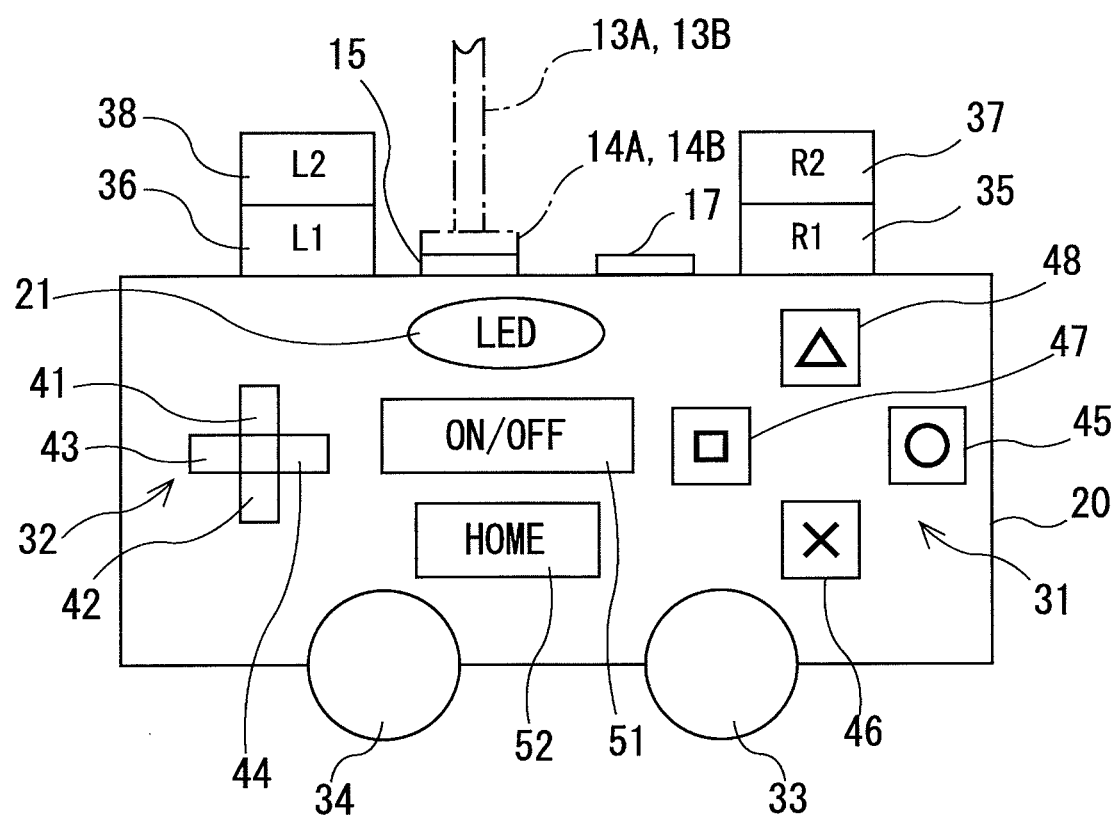
FIG. 2 is a diagram schematically showing an external structure of a controller.

The exterior of the controller 20 is briefly described with reference to FIG. 2.

The controller 20 includes the above-mentioned connection port 15 for USB connection with the console main unit 10, the above-mentioned wireless communication unit 17 for BT communication with the console main unit 10, and the display unit 21 for displaying the virtual controller No. or lighting in a color corresponding to the virtual controller No.

The controller 20 is provided with a right operation part 31 and a left operation part 32 respectively operable by the player's right and left thumbs when the player is gripping the controller 20 in the right and left hands, a right analog operation part 33 and a left analog operation part 34 respectively capable of analog operation also by the right and left thumbs, a first right push button 35 and a first left push button 36 respectively pushed by the right and left index fingers, and a second right push button 37 and a second left push button 38 respectively pushed by the right and left middle fingers.

The left operation part 32 is provided with an up command button 41, a down command button 42, a left command button 43, and a right command button 44 used when the player makes a manipulation such as moving the game character on the screen, for example. Furthermore, the right operation part 31 is provided with first through fourth operation buttons 45 to 48 to which are assigned different functions according to the game application such as setting or executing a function of a game character, for example.

The above-mentioned analog operation parts 33 and 34 are respectively provided with a right and a left rotational operation part (omitted from the drawing), which can rotate 360 degrees around an operational axis and return to a neutral position by a flexible member when not in operation, and a signal generation part (omitted from the drawing), which generates signal in conformity with operation of these right and left rotational operation parts.

The above-mentioned analog operation parts 33 and 34 are used by rotating the right and left rotational operation parts for moving the game characters, for example, while rotating or while varying speed, and for entering command signals for analog movements such as changing form.

Moreover, the controller 20 has an on/off button 51 for turning on/off the power of the controller 20, and a home button 52.

The home button 52 is to be pressed to start communication with the console main unit 10, and to make the console main unit 10 start displaying a menu screen on an image display unit 101. Displaying the menu screen by the console main unit 10 is performed by priority by interrupting other running application programs. Furthermore, the menu screen is displayed even when the home button is depressed, starting communication between the controller 20 and the console main unit 10.

Figure 13:
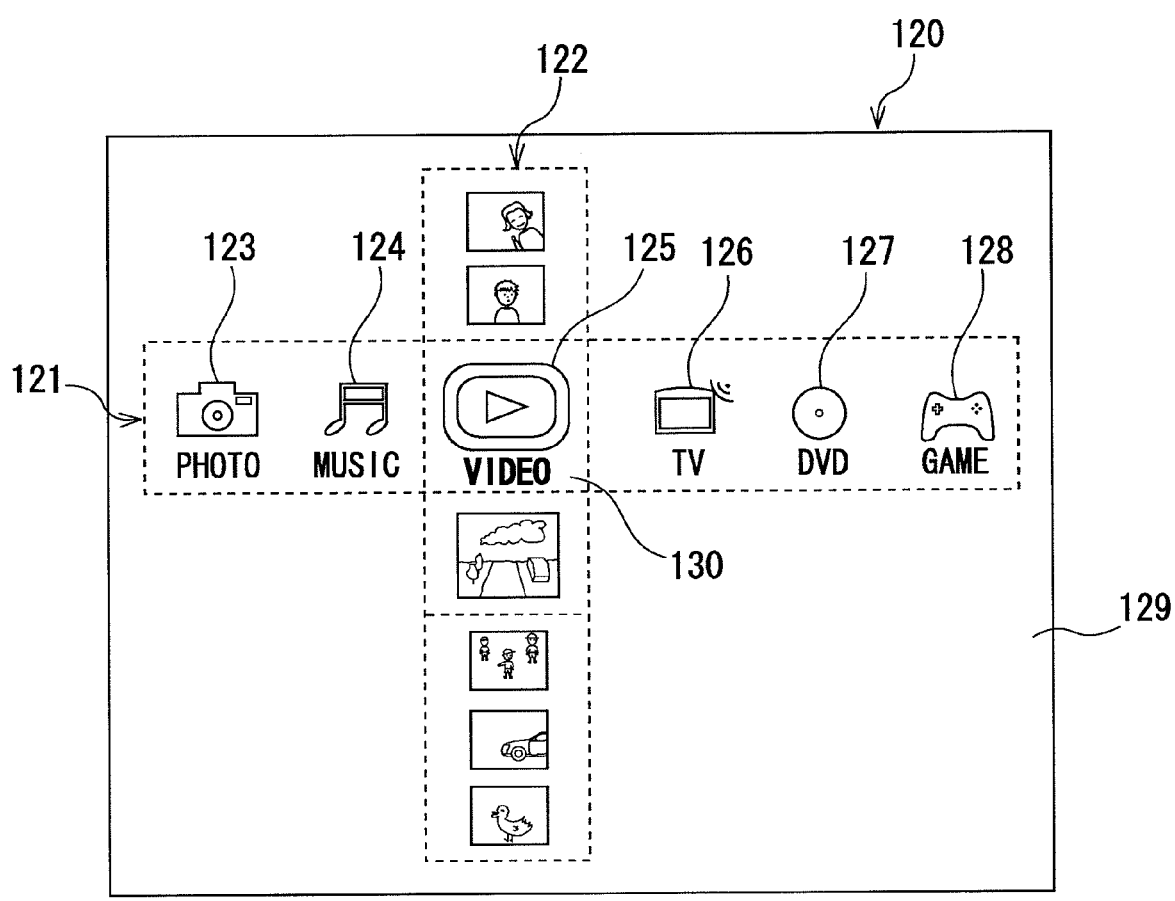
FIG. 13 schematically shows a menu screen.

FIG. 13 shows the menu screen generated by the console main unit 10. As shown in this drawing, a two-dimensional array where a media icon array 121 made up of multiple media icons horizontally lined up crosses a content icon array 122 made up of multiple content icons vertically lined up is displayed on the display screen 120. The media icon array 121 includes a photo icon 123, a music icon 124, a video icon 125, a broadcast icon 126, a disk icon 127, and a game icon 128 as marks indicating types of media that can be reproduced by the console main unit 10. The content icon array 122 includes multiple icons of content thumbnail-size images and the like. The menu screen constituted by the media icon array 121 and the content icon array 122 is an onscreen display and is superimposed on a content screen image. When displaying the content screen image that is currently being reproduced in a background area 129, color for facilitating distinction of appearance from the background area 129 may be applied across the entire area of the media icon array 121 and the content icon array 122, and distinction of appearance may be facilitated using a method such as adjusting brightness of the content screen image.

The media icon, which is positioned in an area including the intersection of the media icon array 121 and the content icon array 122, is displayed as the video icon 125 enlarged in a different color than that of the other media icons as shown in the drawing. With the position of an intersecting region 130 being stationary at approximately the center of the display screen 120, the entire media icon array is moved left and right in conformity with left and right input commands from the user via the controller 20, and color and size of the media icon positioned in the intersecting region 130 is changed. Therefore, a medium can be selected by the user just giving a left or right directional command, and a determination command such as a click operation of a mouse performed on a PC, for example, is unnecessary.

As described above, the right analog operation part 33, the left analog operation part 34, the first right push button 35, the first left push button 36, the second right push button 37, the second left push button 38, the up command button 41, the down command button 42, the left command button 43, the right command button 44, and the first through fourth operation buttons 45 to 48 are used as a first operation part assigned for the player to enter a command regarding execution of an application program, which can be selectively executed by the console main unit 10. At the same time, the home button 52 is not assigned to enter a request for execution of the above-mentioned application program, but is assigned as a second operation part to enter a request for starting display control of the menu screen with priority over other running application programs.

[Internal Circuit Structure of Console Main Unit]

Figure 3:
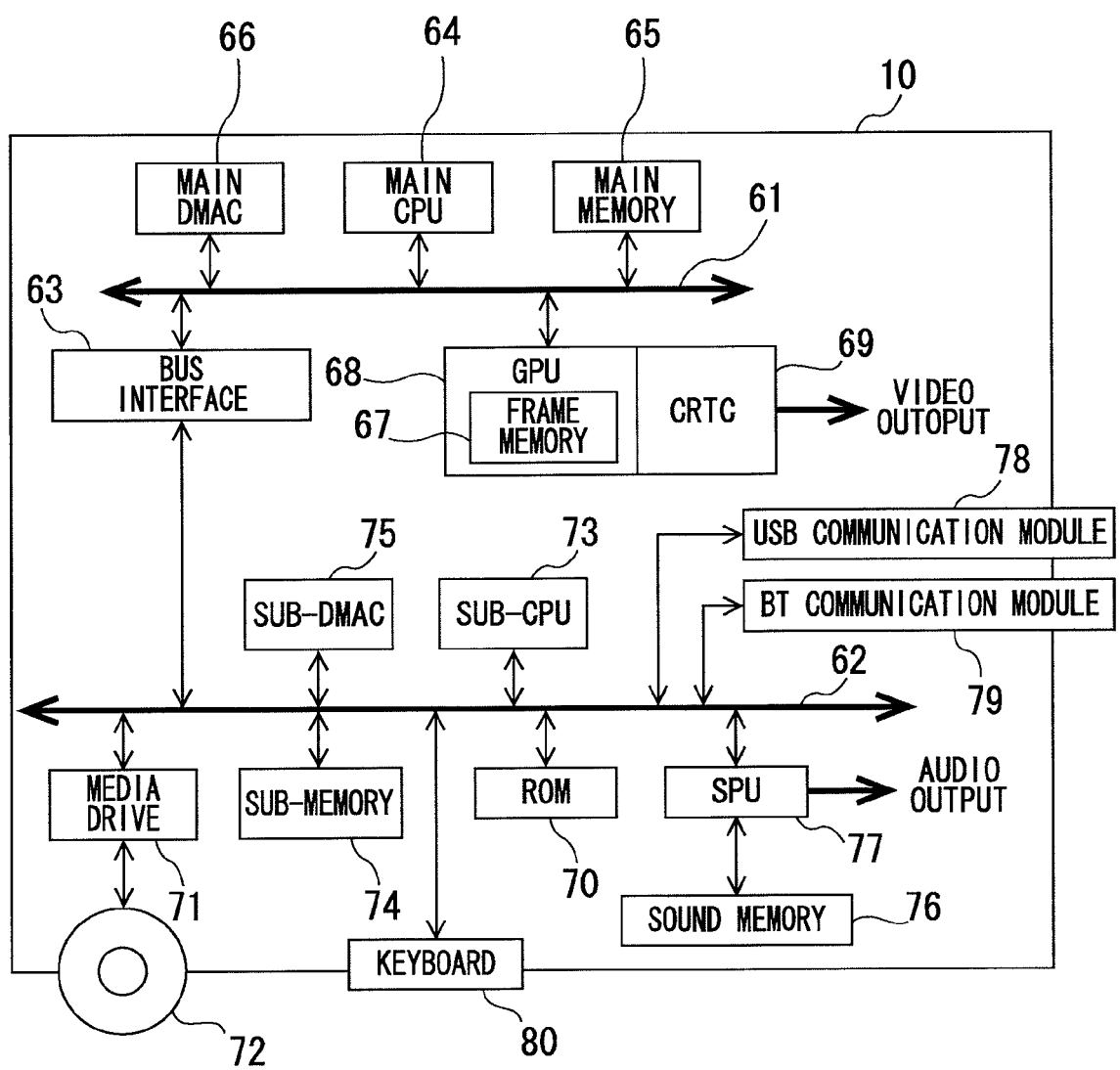
FIG. 3 is a block diagram showing an internal structure of a console main unit.

FIG. 3 shows a main internal structure of the console main unit 10.

As shown in FIG. 3, the console main unit 10 has a main bus 61 and a sub-bus 62, which are either connected or disconnected from each other via a bus interface 63.

A main CPU 64, volatile main memory 65 constituted by DRAM, a main direct memory access controller (DMAC) 66, and a graphic processing unit (GPU) 68 including frame memory 67 are connected to the main bus 61. A CRT controller (CRTC) 69, which is a control means for generating video output signals, is connected to the GPU 68. An image according to video output signals is displayed on a predetermined display unit (the image display unit 101 of the monitor device 100 in this embodiment) connected to the console main unit 10 via a cable or the like.

The main CPU 64 reads a boot program from ROM 70 on the sub-bus 62 via the bus interface 63 when the console main unit 10 starts running, and executes that boot program, and then runs an operating system. Furthermore, it controls a media drive 71, reads the application program or data from a medium 72 loaded into the media drive 71, and stores it in the main memory 65. Moreover, geometric processing is carried out for various types of data read out from the medium 72, such as three-dimensional object data (coordinate values of a polygon vertex (representative point)) constituted by multiple basic figures (polygons). A display list including contents of polygon definition information is generated through the geometric processing. Furthermore, data compressed using the moving picture experts group (MPEG) method or the joint photographic experts group (JPEG) method is decompressed. In other words, the main CPU 64 has an information deciphering function for deciphering information using software.

The polygon definition information includes drawing area setting information and polygon information. The drawing area setting information includes offset coordinates relative to the frame buffer address of a drawing area and coordinates in a drawing clipping area for canceling drawing when coordinates of a polygon exist outside of the drawing area. The polygon information includes polygon attribute information and vertex information; wherein the polygon attribute information includes information specifying shading mode, a blending mode, texture mapping mode, and the like, and vertex information includes information of coordinates within the vertex drawing area, coordinates within a vertex texture area, and vertex color.

The GPU 68 is stored with drawing contexts, reads out an appropriate drawing context based on image context identification information included in the display list informed from the main CPU 64, renders based thereupon, and draws a polygon in the frame memory 67. The frame memory 67 may also be used as texture memory, and thus a pixel image in the frame memory 67 may be applied to the polygon drawn as texture.

The main DMAC 66 controls DMA transfer for respective circuits connected to the main bus 61, and controls DMA transfer for respective circuits connected to the sub-bus 62 in conformity with status of the bus interface 63.

A sub-CPU 73 constituted by a microprocessor or the like, a nonvolatile sub-memory 74 constituted by flash memory or the like, a sub-DMAC 75, the ROM 70 stored with programs such as an operating program, a sound processing unit (SPU) 77, which reads out sound data stored in sound memory 76 and outputs it as audio output, a USB communication module 78, which carries out wired transmission and reception of information to and from the controllers 20 through BT communication, a BT communication module 79, which carries out wireless transmission and reception of information to and from the controllers 20 through BT communication, a media drive 71 for loading a predetermined medium 72, and a keyboard 80 are connected to the sub-bus 62. The medium 72 is a recording medium such as a CD-ROM or DVD-ROM recorded with an image processing program. The console main unit 10 reads this image processing program to conduct necessary entertainment processing. The USB communication module 78 includes the controller ports 11 (shown in FIG. 1), and the BT communication module 79 includes a wireless transmitter 16 (shown in FIG. 1).

The sub-CPU 73 carries out various operations in conformity with the program stored in the ROM 70. The sub-DMAC 75 controls DMA transfer for respective circuits connected to the sub-bus 62 only when the bus interface 63 has disconnected the main bus 61 from the sub-bus 62.

Furthermore, a wired controller No. registration table (shown in FIG. 5) and a wireless controller No. registration table (shown in FIG. 6) to be hereafter described are preset in the sub-memory 74 while a virtual controller No. correspondence table (shown in FIG. 7) to be hereafter described is preset in the main memory 65. Once USB communication module 78 or the BT communication module 79 starts communicating with the controller 20, the main CPU 64 conducts (wired) processing for registration and correspondence of an unregistered controller to be hereinafter described (shown in FIG. 8) or processing for the controller having started communication for which wired and wireless modes are registered and corresponded thereto (shown in FIG. 9). Note that the above-mentioned respective tables may be set in another storage unit, and the above-mentioned respective processing may be conducted by the sub-CPU 73.

Moreover, the main CPU 64 conducts battery monitoring (shown in FIG. 10) and RSSI monitoring (shown in FIG. 11) during BT communication. Here, RSSI denotes electric field intensity as a connecting environment between the console main unit 10 and the controllers 20 during wireless communication, and the stronger (large numerical value) the electric field intensity becomes, the more stable BT communication becomes possible. Note that detection of the electric field intensity is performed by the BT communication module 79.

[Internal Structure of Controller]

Figure 4:
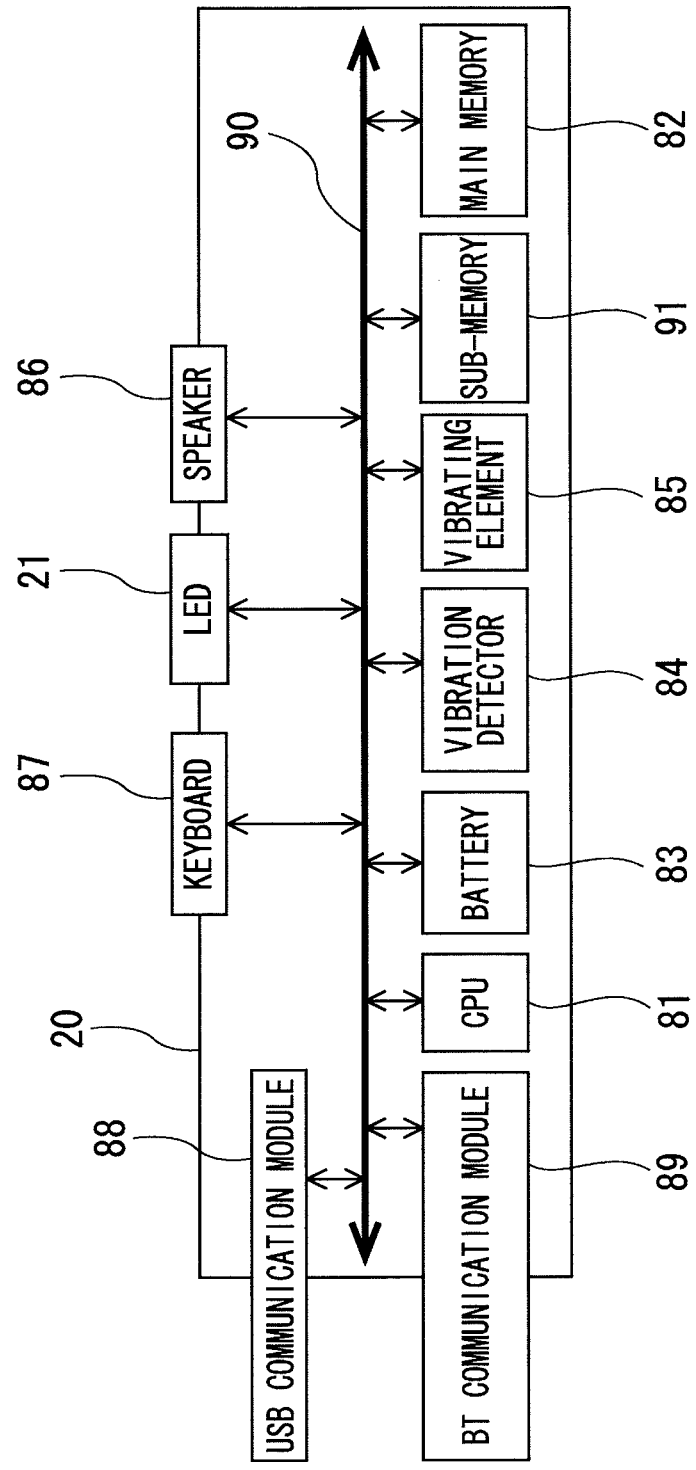
FIG. 4 is a block diagram showing an internal structure of the controller.

FIG. 4 shows a main internal structure of the controller 20.

In FIG. 4, the controller 20 has a CPU 81, nonvolatile main memory 82 constituted by DRAM, a battery 83, a vibration detector 84, a vibrating element 85, a speaker 86, a keyboard 87, the display unit (segment display or LED) 21, a USB communication module 88, a BT communication module 89, and nonvolatile sub-memory 91 constituted by flash memory or the like, which are connected via a bus 90. The keyboard 86 refers collectively to the above-mentioned various types of input buttons 33, 34, 35 to 38, 41 to 48, 51, and 52 provided on the controller 20.

The CPU 81 reads a boot program in from the sub-memory 91 when activating the controller 20 and then executes the boot program. Furthermore, the CPU 81 performs display control for keeping the display unit 21 in a predetermined light emitting status, audio control for controlling audio output to the speaker 86, and vibration control for providing vibration to the controller 20 by driving the vibrating element 85. Moreover, the main CPU 64 calculates total amounts of respective charged and discharged current of the battery 83, finding a remaining charge amount in the battery 83.

The USB communication module 88 transmits and receives information to/from the console main unit 10 via a USB connecting cable through wired communication while the BT communication module 89 wirelessly transmits and receives information to/from the console main unit 10 through BT communication. The USB communication module 88 includes the connection port 15 (shown in FIG. 1) while the BT communication module 89 includes a wireless transmitter 17 (shown in FIG. 1).

Furthermore, the sub-memory 91 is prestored with unique IDs as terminal identification information uniquely given to the respective controllers 20. The CPU 81 reads out a unique ID from the sub-memory 91 at a predetermined timing, and transmits the unique ID to the console main unit 10 from either the USB communication module 88 or the BT communication module 89.

Furthermore, the CPU 81 generates a preset command signal in conformity with an operation input to the keyboard 87 by the player, and transmits the generated command signal to the console main unit 10 from the USB communication module 88 or the BT communication module 89. More specifically, when the home button 52 functioning as a second operation part, and at least one of the other input buttons 33, 34, 35 to 38, and 41 to 48 functioning as a first operation part are depressed at the same time, the CPU 81 transmits a specified processing execution command signal in conformity with the button combination. In this embodiment, simultaneous depression of the home button 52 and a cross marked button 46 generates a specified processing execution command signal commanding a virtual controller No. to be hereinafter described to start screen display processing; simultaneous depression of the home button 52 and a circle marked button 45 generates a specified processing execution command signal commanding to display the remaining charge amount to be hereinafter described; and simultaneous depression of the home button 52 and a triangle marked button 48 generates a specified processing execution command signal commanding to display the electric field intensity to be hereinafter described.

Note that USB cables 13A and 13B (shown in FIG. 1) connecting the controllers 20 to the console main unit 10 respectively include a power line, and with a USB connection, the console main unit 10 supplies power to the controllers 20 via the power line, thereby charging the battery 83.

Furthermore, the vibrating element 85 includes a fixed weight eccentric to the motor rotational axis, which rotates due to the motor running to make the controllers 20 vibrate. Running the motor in accordance with progression status of the game conveys a vibration to the player's hands at a predetermined timing. Moreover, the vibration detector 84 is a sensor for detecting vibration applied to the controllers 20 by the player, and is used for detecting a vibration from the player and then starting predetermined processing, such as turning on the controllers 20 in an off state.

[Description of Controller Connection Management Program]

In order to implement an arbitrary and favorable wired or wireless connection to multiple controllers, the console main unit 10 of this embodiment carries out recognition and management of the respectively connected controllers 20, transmission of display information (correspondence information) for displaying on the display unit 21 of the respective controllers 20, monitoring of the battery 83 during BT communication, and RSSI monitoring by algorithm shown in time chart of FIGS. 8 to 11 (hereafter referred to as controller connection management program).

Note that the processing of FIGS. 8 to 11 is implemented by the main CPU 64 of the console main unit 10 mainly executing a controller connection management program, which is provided in a game application program or a device drive program.

[Description of Tables]

The wired controller No. registration table shown in FIG. 5 and the wireless controller No. registration table shown in FIG. 6 are preset in the sub-memory 74 while the virtual controller No. correspondence table shown in FIG. 7 is preset in the main memory 65.

In the wired controller No. registration table, multiple cells stored with wired controller Nos. and multiple cells stored with the unique IDs for the respective controllers 20 are in a one-to-one correspondence. Every time a new controller 20 is registered via the USB connection, wired controller Nos. ('W-01', 'W-02', 'W-03', and 'W-04') and unique IDs ('C-02', 'C-03', 'C-04', and 'C-01') are sequentially stored starting with the first empty cells (upward in the drawing). When controllers 20 having the respective unique IDs 'C-02', 'C-03', 'C-04' and 'C-01', for example, are newly registered in this order, the unique ID 'C-02' and the wired controller No. 'W-01' are firstly corresponded and registered, the unique ID 'C-03' and the wired controller No. 'W-02' are corresponded and registered next, the unique ID 'C-04' and the wired controller No. 'W-03' are then corresponded and registered, and the unique ID 'C-01' and the wired controller No. 'W-04' are lastly corresponded and registered, as shown in FIG. 5.

In the wireless controller No. registration table, multiple cells stored with wireless controller Nos. and multiple cells stored with the unique IDs for the respective controllers 20 are in a one-to-one correspondence. Every time a controller 20 already registered in the wired controller No. registration table via the USB connection is first connected to the console main unit 10 through BT communication, wireless controller Nos. ('R-01', 'R-02', 'R-03') and unique IDs ('C-03', 'C-02', 'C-01') are sequentially stored starting with the first empty cells (upward in the drawing). For example, when the four controllers 20 having the respective unique IDs 'C-01', 'C-02', 'C-03' and 'C-04' are already registered in the wired controller No. registration table as described above, and the controllers 20 having the unique IDs 'C-03', 'C-02', 'C-01' therefrom are newly connected in this order to the console main unit 10 through BT communication, the unique ID 'C-03' and the wireless controller No. 'R-01' are firstly corresponded and registered, the unique ID 'C-02' and the wired controller No. 'R-02' are corresponded and registered next, and the unique ID 'C-01' and the wired controller No. 'R-03' are lastly corresponded and registered, as shown in FIG. 6. Note that since the controller 20 having the unique ID 'C-04' is not yet connected to the console main unit 10 through BT communication, it is not registered in the wireless controller No. registration table, and this unique ID 'C-04' and a wireless controller No. are corresponded and registered when the controller 20 having the unique ID 'C-04' is first connected to the console main unit 10 through BT communication. Note that since FIGS. 6 and 7 show states before the unique ID 'C-04' and a wireless controller No. are corresponded and registered, the unique ID and wireless controller No. are represented as '(R-04)' and '(C-04)', respectively. Meanwhile, the unique ID for the connected console main unit 10 is registered in the sub-memory 91 of the respective controllers 20. Since the sub-memory 74 and the sub-memory 91 are nonvolatile as described above, the registered (stored) unique IDs are not lost (deleted) even if power of the console main unit 10 and/or the respective controllers 20 is turned off. This allows prevention of malfunction between the unregistered console main unit 10 and controllers 20 by checking unique IDs even when the power is turned on again.

In the virtual controller No. correspondence table, multiple cells preset and stored with multiple virtual controller Nos. and multiple cells stored with wired controller Nos. and wireless controller Nos. (hereafter, both are referred to as physical controller Nos.), and multiple cells stored with unique IDs are in a one-to-one-to-one correspondence. Furthermore, cells prestored with colors corresponding to the respective virtual controller Nos. are set in correspondence to the virtual controller Nos. Every time a new controller 20 is registered in the wired controller No. registration table, wired controller Nos. ('W-01', 'W-02', 'W-03', 'W-04') are sequentially stored starting with the first empty cells (upward in the drawing) of the entire cells to be stored with the physical controller Nos. For example, in the example given above, the wired controller No. 'W-01' is corresponded to a virtual controller No. 'V-01', the wired controller No. 'W-02' is corresponded to a virtual controller No. 'V-02', the wired controller No. 'W-03' is corresponded to a virtual controller No. 'V-03', and the wired controller No. 'W-04' is corresponded to a virtual controller No. 'V-04', as shown in FIG. 7. Furthermore, the wireless controller No. 'R-02' is corresponded to the virtual controller No. 'V-01', the wireless controller No. 'R-01' is corresponded to the virtual controller No. 'V-02', and the wireless controller No. 'R-03' is corresponded to the virtual controller No. 'V-04'. Note that the wireless controller No. corresponding to the virtual controller No. 'V-03' is set in the virtual controller No. correspondence table when the controller 20 having the unique ID 'C-04' is registered in the wireless controller No. registration table. Moreover, the unique IDs for the respective controllers 20 are also corresponded.

While the correspondences set in the virtual controller No. correspondence table are lost when the power of the console main unit 10 is turned off since the virtual controller No. correspondence table is stored in the nonvolatile main memory 65, elimination or change of said correspondences by a user operation is possible. The application program executed by the console main unit 10 checks the virtual controller No. correspondence table during execution, and one of the virtual controller Nos. effectively corresponded to a wired or wireless controller No., and a unique ID and one character of the application program are corresponded. Even when there is multiple effective virtual controller Nos. and characters, they are corresponded one-to-one.

[Description of Initial Processing for Connection between Controller and Console Main Unit]

The console main unit 10 in an off-state is turned on by supplying power. A controller 20 in an off-state is turned on by depressing the on/off button 51. Note that when the console main unit 10 and the controller 20 are in an on-state, and the on/off button 51 of the controller 20 is depressed where the console main unit 10 and the controller 20 are connected through BT communication, the console main unit 10 goes into standby state (sleep state) if the controller 20 is turned off.

Communication through a USB connection starts when the home button 52 of the controller 20 is depressed after both of the console main unit 10 and the controller 20 are in an on-state and a USB connection is established therebetween. Once the USB connection starts, the console main unit 10 and the controller 20 conduct communication preparation for transmission and reception of information through the USB communication. Afterwards, the controller 20 reads out the unique ID stored in the sub-memory 91 and then transmits it to the console main unit 10. Note that the console main unit 10 determines whether there is a USB connection by detecting whether the USB cable is properly connected.

BT communication starts when the home button 52 of the controller 20 is depressed in a state that both of the console main unit 10 and the controller 20 are in an on-state and that neither of the console main unit 10 nor the controller 20 is in a USB connection. In this case, the controller 20 must be positioned within a communication range of the console main unit 10. Once the BT connection starts, the console main unit 10 and the controller 20 conduct communication preparation for transmission and reception of information through the BT communication. Afterwards, the controller 20 reads out the unique ID stored from the sub-memory 91 and then transmits it to the console main unit 10. Note that the console main unit 10 shifts from being in a standby state to an on-state and BT communication starts when the home button 52 of the controller 20 is depressed in a state that both the console main unit 10 and the controller 20 are in an off-state and that neither of the console main unit 10 nor the controller 20 is in a USB connection.

Figure 12:
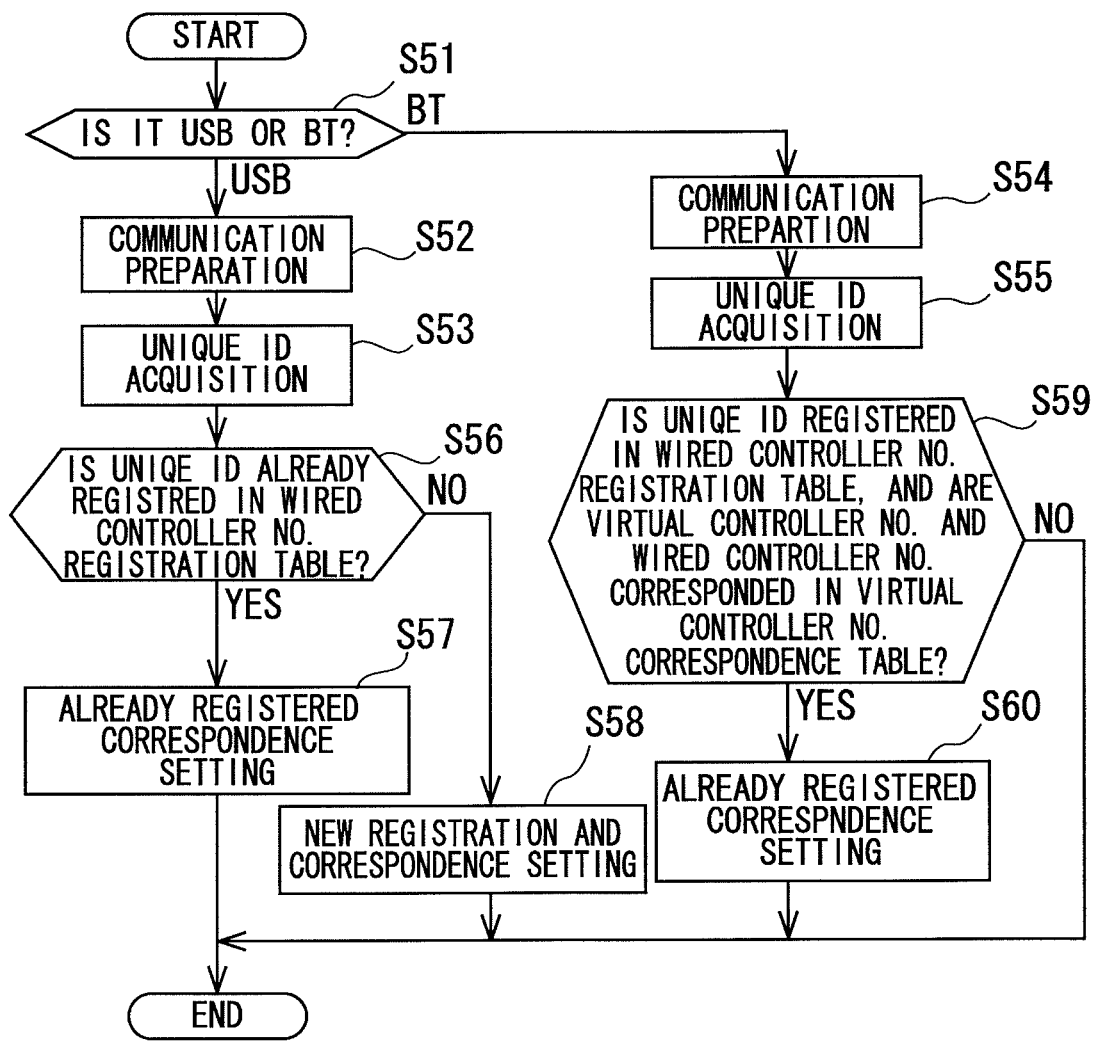
FIG. 12 is a flowchart showing processing carried out by the console main unit at the time of communication commencement.

In other words, when connection with the controller 20 starts, the main CPU 64 of the console main unit 10 determines whether it is a USB connection or a BT connection, as shown in FIG. 12 (Step S51). In the case of the USB connection, communication preparation for transmission and reception of information through the USB communication is conducted (Step S52), and a unique ID is acquired from the controller 20 via the USB connection (Step S53). On the other hand, in the case of the BT connection, communication preparation for transmission and reception of information through the BT communication is conducted (Step S54), and the unique ID is acquired from the controller 20 via the BT connection (Step S55).

In the case of communication via the USB connection, the main CPU 64 of the console main unit 10 determines whether the unique ID received by the USB communication module 78 is registered in the wired controller No. registration table (Step S56), and if it has already been registered, sets the already registered correspondence (Step S57), and otherwise if it is not yet registered, then sets a new registration and correspondence (Step S58).

In the already registered correspondence setting during the USB connection (Step S57), the main CPU 64 reads out a wired controller No. having correspondence with the above-mentioned received unique ID from the wired controller No. registration table. Said wired controller No. and unique ID are stored in the first empty cell of the entire cells to be stored with physical controller Nos. (wired controller Nos.). As a result, the virtual controller No., the wired controller No., and the unique ID are corresponded and stored in the virtual controller No. correspondence table.

In the new registration and correspondence setting during the USB connection (Step S58), the main CPU 64 corresponds a unique ID to an arbitrary wired controller No. to which no correspondence is set yet and registers them in the wired controller No. registration table. Next, the wired controller No. corresponded to the unique ID is corresponded to an arbitrary virtual controller No. to which no correspondence is set yet, and the correspondences of this virtual controller No., the wired controller No., and the unique ID are then set in the virtual controller No. correspondence table.

Meanwhile, in the case of BT communication, the main CPU 64 registers the unique ID received by the BT communication module 79 in the wired controller No. registration table, determines whether the virtual controller No. and the wired controller No. are corresponded in the virtual controller No. correspondence table (Step S59), and if it has already been registered and corresponded, set s the already registered correspondence (Step S60). Otherwise, if it is not yet registered or corresponded, a new registration and correspondence is not set. In other words, a new registration and correspondence for BT communication can be set only when registration in the wired controller No. registration table is completed and when correspondence is made in the virtual controller No. correspondence table.

In registration and correspondence setting during BT communication (Step S60), the main CPU 64 determines whether the unique ID received by the BT communication module 79 is registered in the wireless controller No. registration table. If it has already been registered, the wireless controller No. corresponded to the above-given unique ID is read out from the wireless controller No. registration table. The read out wireless controller No. is then stored in the virtual controller No. correspondence table in an empty wireless controller No. cell corresponding to that unique ID. As a result, the virtual controller No., the physical controller Nos. (the wired controller No. and the wireless controller No.), and the unique ID are corresponded and stored in the virtual controller No. correspondence table. Contrarily, if the unique ID received by the BT communication module 79 is not yet registered in the wireless controller No. registration table, one wireless controller No. to which no correspondence is set yet and the above-given unique ID are corresponded and registered in the wireless controller No. registration table. The wireless controller No. corresponded to that unique ID is then read out from the wireless controller No. registration table. Furthermore, the read out wireless controller No. is then stored in the virtual controller No. correspondence table in an empty wireless controller No. cell corresponding to that unique ID. As a result, the virtual controller No., the physical controller No. (the wired controller No. and the wireless controller No.), and the unique ID are corresponded and stored in the virtual controller No. correspondence table. In other words, the wired controller numbers corresponded to the respective virtual controller Nos. are identical to the wireless controller Nos., which denote the respective controllers 20, and thus there is only one unique ID.

The main CPU 64 then associates a single virtual controller No. corresponded to the unique ID to execution of an application program such as a game if the above-mentioned already registered correspondence is set or a new registration and correspondence setting are completed. More specifically, correspondence between a character of a game, for example, and the controller 20 manipulating that character is set in conformity with inputting operation to the controller 20 by the player.

Since correspondence between the console main unit 10 and the controller 20 is set by corresponding the virtual controller No. and the unique ID in this manner, correspondence of both of them is possible irrespective of a wired or wireless connection.

Accordingly, for example, even if the connection is changed from wired to wireless or wireless to wired while the game is in execution, the game may be continued as is without particularly changing the correspondence between the controller 20 and the character of the game in execution. Furthermore, when executing the game by a wire connected controller 20, the game may similarly be continued as is even if switching the plug-in connector 12A inserted into one of the plurality of controller ports 11 of the console main unit 10 to another controller port.

Moreover, since new registration and correspondence setting for an unregistered controller 20 is allowed only with a wired connection (USB connection) and is prohibited with a wireless communication (BT communication), new registration and correspondence setting are not conducted in the console main unit 10 even if an unrelated third controller exists within the allowable region for BT communication with the console main unit 10, and the console main unit 10 receives information from this unrelated controller through BT communication, thereby preventing the unrelated controller from being unintentionally, erroneously registered.

Even if the controller 20 is unregistered, since correspondence of the unique ID for said controller 20 to a wired or wireless controller No. is stored in the nonvolatile submemory 74 through a new wired or wireless registration to the console main unit 10, an additional wired or wireless registration to the console main unit 10 when using the controller 20 is unnecessary.

Furthermore, the developer(s) of the application program, when creating the program, need only to consider correspondence to the virtual controller Nos. and not the connection method, and thereby do not invite any complications with creation of the program.

Moreover, even for the conventional application program with a prerequisite of a wired connection, correspondence of the controllers 20 may also be conducted with the conventional application program by using the virtual controller Nos. in place of the port numbers for the controller ports.

[Explanation of (Wired) Processing for Registration and Correspondence of Unregistered Controller]

In the case of conducting communication using a controller 20 not yet used once (hereafter referred to as unregistered controller 20) by the console main unit 10 (e.g., when first using a controller 20 after purchase), the player must first conduct (wired) processing for registration and correspondence of the controller 20.

Figure 8:
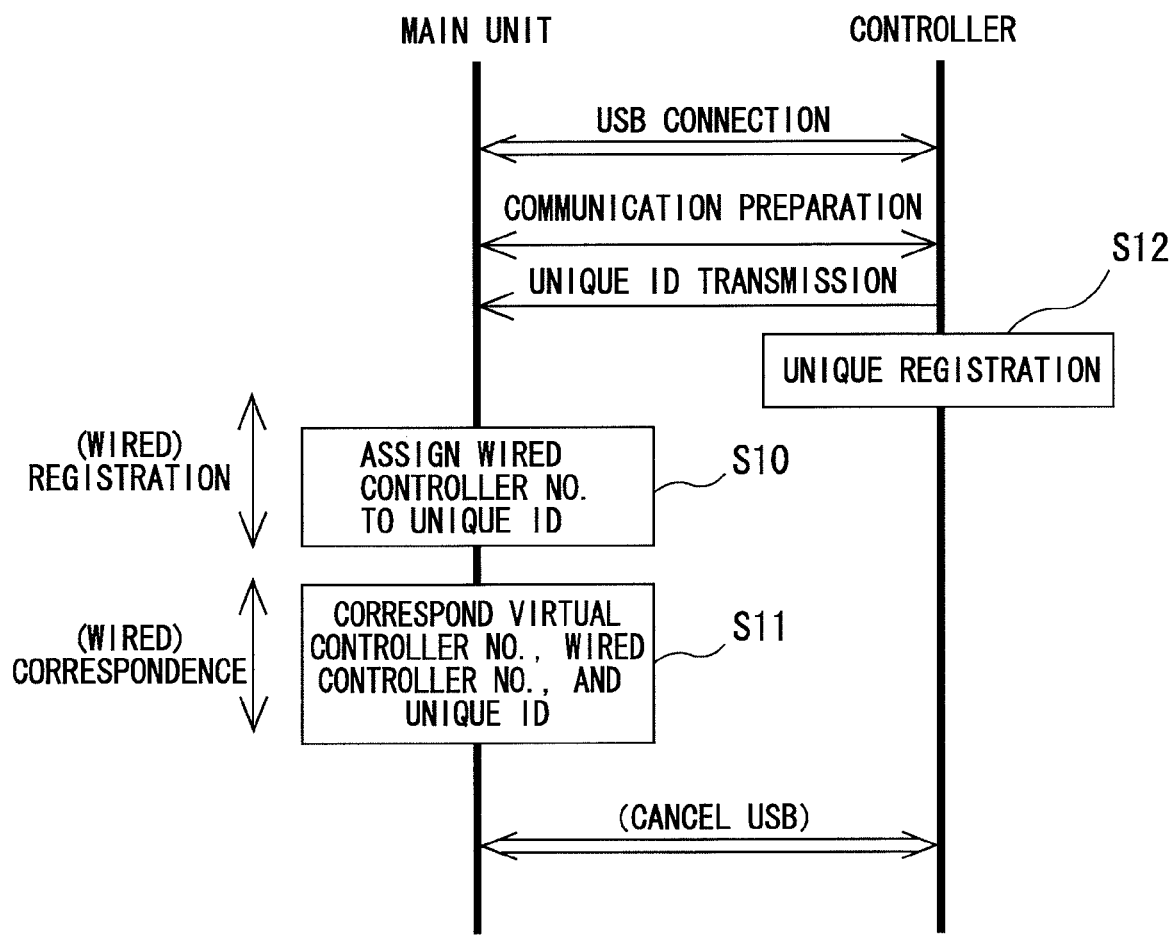
FIG. 8 is a time chart showing processing for controller registration and correspondence.

This (wired) processing for registration and correspondence can be conducted with a wired connection (USB connection) as described above. In other words, when a USB connection is established between the console main unit 10 and the unregistered controller 20, the unique ID for the controller 20 is transmitted from said controller 20 to the console main unit 10 upon completion of communication preparation, as shown in FIG. 8. Similarly, the unique ID for the console main unit 10 is transmitted from said console main unit 10 to the controller 20.

The console main unit 10 determines whether the received unique ID has already been registered in the wired controller No. registration table (Step S56 in FIG. 12). In this case, since the controller 20 is unregistered, it is determined as not being registered in the wired controller No. registration table, and the console main unit 10 conducts registration, that is, assigning a wired controller No to the unique ID (Step S10). More specifically, new registration and correspondence setting of Step S58 in FIG. 12 are conducted, a wired controller No. is assigned to the unique ID, and these wired controller No. and the unique ID are then registered in the wired controller No.

registration table. Similarly, the controller 20 registers the received unique ID for the console main unit 10 in the sub-memory 91 (Step S12).

Next, the console main unit 10 corresponds a virtual controller No., a wired controller No., and a unique ID (Step S11). More specifically, said wired controller No. and unique ID are stored in the first empty cell of the entire cells to be stored with the physical controller Nos. (wired controller Nos.) in the virtual controller No. correspondence table. As a result, the virtual controller No., the wired controller No., and the unique ID are corresponded and stored in the virtual controller No. correspondence table.

This completes the (wired) processing for registration and correspondence of the controller 20. The correspondences in the virtual controller No. correspondence table are lost if either the console main unit 10 or the controller 20 is turned off, but memory content of the physical controller No. registration table is not lost. Alternatively, said correspondences and said memory content can be erased by a user operation.

Note that when executing an application program such as a game while maintaining a USB connection, processing proceeds to the next processing hereinafter to be described (processing for associating a single virtual controller No., which is corresponded to a unique ID and a physical controller No., to execution of an application program such as a game).

[Description of Initial Processing for Communication by Wired and Wireless Controllers having Undergone Registration and Correspondence]

Figure 9:
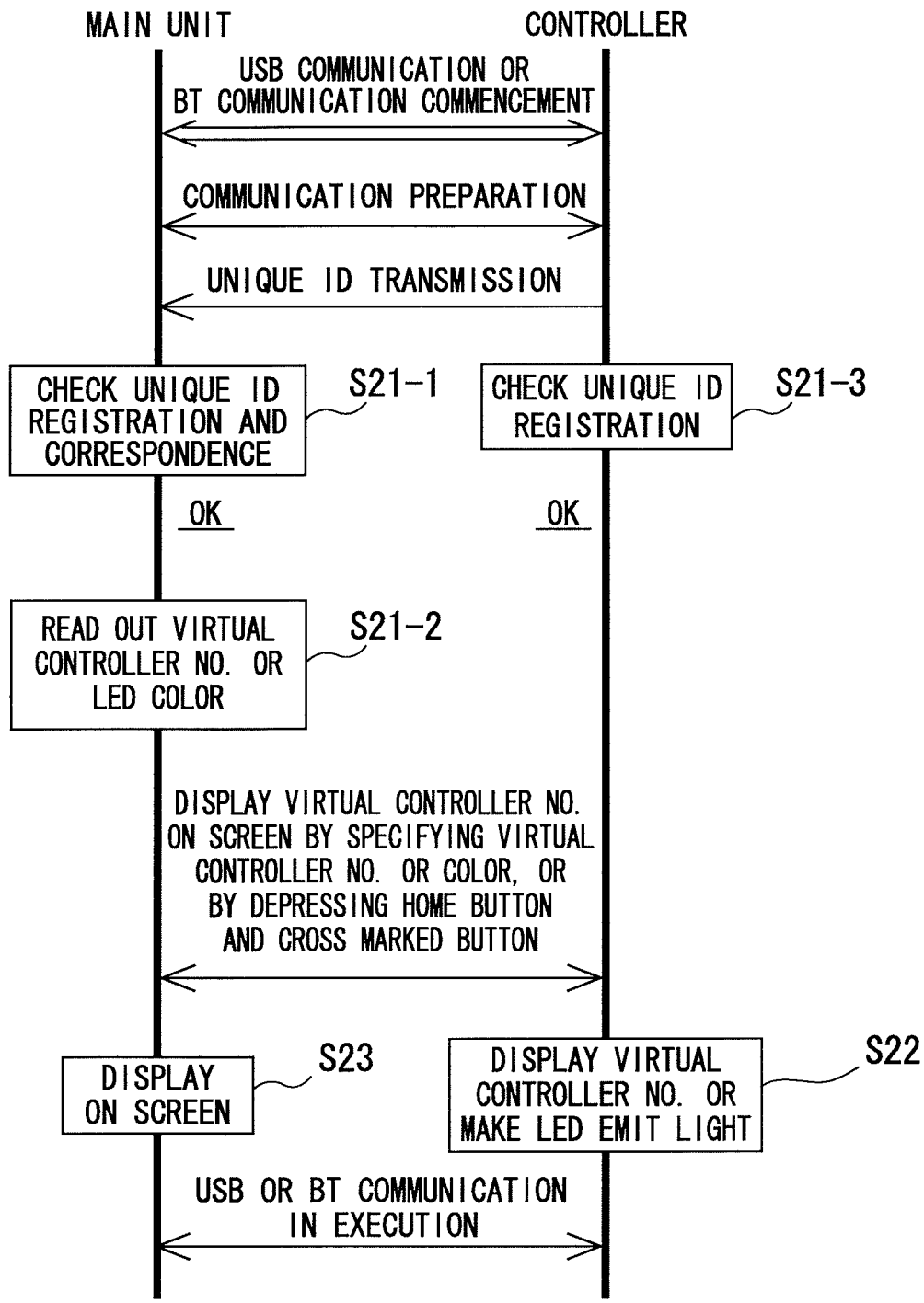
FIG. 9 is a time chart showing that a controller for which a wired and a wireless connection have been registered and a correspondence has been established starts communication.

When starting communication using wired and wireless controllers 20 having already undergone registration and correspondence for the console main unit 10 (hereafter referred to as already registered and corresponded wired and wireless controllers 20), communication via a USB connection or BT communication starts, and upon completion of predetermined communication preparation, unique IDs for the controllers 20 are transmitted from said controllers 20 to the console main unit 10, as shown in FIG. 9. Similarly, the unique ID for the console main unit 10 is transmitted from said console main unit 10 to the controllers 20. The console main unit 10 determines the registration and correspondence of the respective received unique IDs for both wired and wireless controllers (Step S21-1). If the registration and correspondence for both wired and wireless controllers are completed, correspondences between virtual controller Nos. and physical controller Nos. corresponding to the unique IDs, and information indicating corresponding colors are read out from the virtual controller No. correspondence table (Step S21-2). Processing of these steps S21 and S22 is conducted since the wired and wireless controllers 20 have already undergone registration and correspondence. Similarly, the controllers 20 also determine whether the unique IDs received by the console main unit 10 are registered in the sub-memory 91 (Step S21-2). Processing continues since this determination has already been registered in the console main unit 10.

More specifically, in both the USB connection and the BT communication, the console main unit 10 determines whether the received unique IDs for the controllers 20 are registered in the wired controller No. registration table, and whether they are corresponded in the virtual controller correspondence table.

Next, the console main unit 10 reads out information of the virtual controller Nos. corresponding to the received unique IDs or colors corresponding to the virtual controller Nos. from the virtual controller correspondence table, and transmits the read out information of virtual controller Nos. or colors to the controllers 20. The controllers 20 store the received information of virtual controller Nos. or colors in the main memory 82. The information of virtual controller Nos. or colors is lost when the controllers 20 are turned off, and deletion and/or change thereof is possible by a user operation.

With the controllers 20, the CPU 81 controls the display unit (segment display or LED) 21 based on the information of virtual controller Nos. or colors received from the console main unit 10 (Step S22). In the case of a segment display, the display unit 21 of the respective controllers 20 displays the above-mentioned virtual controller Nos. as numeric data. In the case of an LED, the display unit 21 of the respective controllers 20 displays the above-mentioned colors corresponding to the virtual controller Nos. For example, when the respective tables are set as shown in FIGS. 5 through 7, the display unit 21 of the controller 20 having the unique ID 'C-02' lights in 'red', the display unit 21 of the controller 20 having the unique ID 'C-03' lights in 'yellow', the display unit 21 of the controller 20 having the unique ID 'C-04' lights in 'blue', and the display unit 21 of the controller 20 having the unique ID 'C-01' lights in 'black'.

Note that in this embodiment, when the display unit 21 is an LED, the information of colors is corresponded in the virtual controller correspondence table of the console main unit 10, and the information of colors corresponding to the virtual controller Nos. is transmitted to the controllers 20 from the console main unit 10; however, the information of the virtual controller Nos. and the colors corresponding thereto may be pre-corresponded in the sub-memory 91 of the respective controllers 20, and the virtual controller Nos. then transmitted to the controllers 20 from the console main unit 10.

Furthermore, as a different embodiment, the USB transmission module 88 or the BT communication module 89 of the respective controllers 20 may transmit a screen display request signal to the console main unit 10 when a predetermined input to the respective controllers 20 has been made. With said different embodiment, an operation of simultaneously depressing the home button 52 and another key (e.g., the cross marked button 46) is set as an example of this predetermined input.

Afterwards, in the console main unit 10, when the USB communication module 78 or the BT communication module 79 receives the above-mentioned specified processing execution command signal, the main CPU 64 outputs an image display output command signal to the GPU 68, and the GPU 68 then displays the above-mentioned colors and virtual controller Nos. on the image display unit 101 of the monitor 100 (Step S23). For example, when the respective tables are set as shown in FIGS. 5 through 7, the image display unit 101 displays the virtual controller No. 'V-01' with the color red when the above-mentioned predetermined input is made on the controller 20 having the unique ID 'C-02', the image display unit 101 displays the virtual controller No. 'V-02' with the color yellow when the above-mentioned predetermined input is made on the controller 20 having the unique ID 'C-03', the image display unit 101 displays the virtual controller No. 'V-03' with the color blue when the above-mentioned predetermined input is made on the controller 20 having the unique ID 'C-04', and the image display unit 101 displays the virtual controller No. 'V-04' with the color black when the above-mentioned predetermined input is made on the controller 20 having the unique ID 'C-01'.

Furthermore, displaying the above-mentioned colors and virtual controller Nos. on the image display unit 101 of the monitor device 100 is not limited to the time of communication commencement. In other words, even when the home button 52 and the cross marked button 46 of the controller 20 stored with said virtual controller No. are depressed simultaneously while the application program associated to that virtual controller No. is in execution, and the console main unit 10 has received a specified processing execution command signal in conformity with this button operation, the above-mentioned processing is conducted. In this case, the colors and the virtual controller Nos. are preferably superimposed on the screen of the application program in execution.

As a result, the player may view the virtual controller No. of the controller 20 he/she is using by displaying it on the image display unit 101 of the monitor device 100 at arbitrary timings.

Then, if registration and correspondence of the unique IDs received by the wired and wireless controllers is completed, the main CPU 64 associates a single virtual controller No. corresponded to a unique ID and a physical controller No. to execution of an application program such as a game in conformity with an input operation to the controller 20 by the player. At this time, since the player can correspond the controller 20 to a character in the game, for example, while visually identifying the virtual controller No. or color on the display unit 21 of the controller 20 he/she operates and the color and the virtual controller No. displayed on the image display unit 101 of the monitor device 100, association (e.g., correspondence between the controller 20 and a character) between the controller 20 and the application program may be easily and securely performed.

Note that even with the (wired) processing for registration and correspondence of an unregistered controller shown in FIG. 8, color control for the display unit 21 of the controller 20 to report the above-mentioned controller No., and display control for the image display unit 101 of the monitor device 100 may be conducted after new registration and correspondence setting are completed. As described above, registration of the unique IDs between the console main unit 10 and the respective controllers 20 is stored in the nonvolatile sub-memory 74 and sub-memory 91, and correspondence between the virtual controller Nos. and the physical controller Nos. is stored in the volatile main memory 65 and 82. As a result, for example, in the case of bringing one's own controller 20 to a friend's house, registering unique IDs between said controller and the friend's console main unit 10 and corresponding virtual controller Nos. and physical controller Nos. makes it unnecessary to carry out registration of unique IDs from the next time on.

[Description of Processing for Battery Monitoring During BT Communication]

Figure 10:
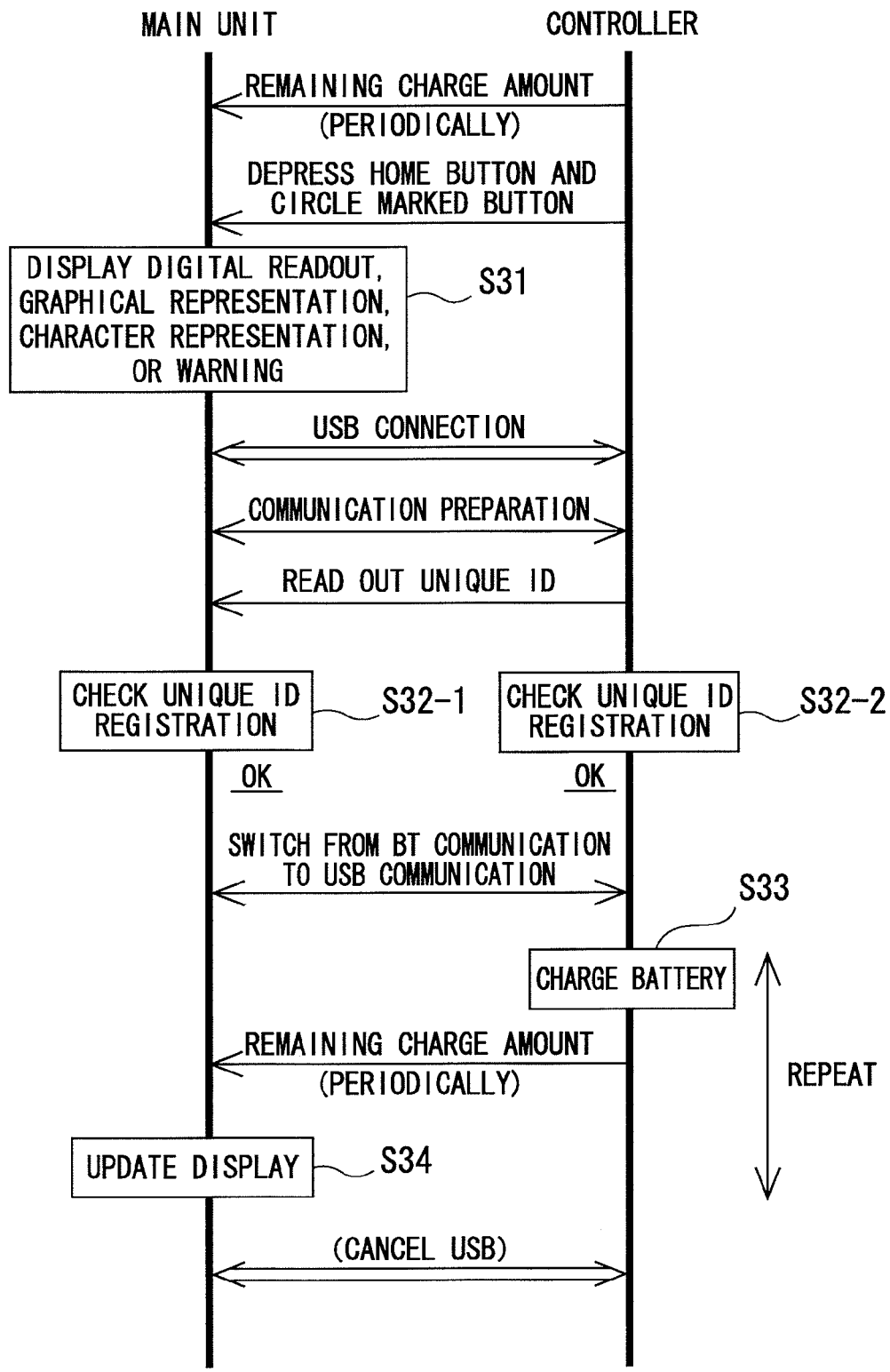
FIG. 10 is a time chart showing battery monitoring.

As shown in FIG. 10, the CPU 81 in the controller 20 periodically calculates the remaining charge amount in the battery 83 during BT communication, and the BT communication module 89 transmits every time information (data of the remaining charge amount) indicating this remaining charge amount to the console main unit 10. Note that while battery monitoring during BT communication is described, the CPU 81 periodically calculates the remaining charge amount in the battery 83 regardless of connection method, and in the case of a USB connection, the data thereof is transmitted every time to the console main unit 10 by the USB communication module 88.

When the home button 52 and the circle marked button 45 of the controller 20 stored with said virtual controller No. are depressed simultaneously while an application program associated with that virtual controller No. is in execution, and the console main unit 10 has received a specified processing execution command signal in conformity with this button operation, the console main unit 10 starts displaying the remaining charge amount.

For displaying the remaining charge amount, the main CPU 64 of the console main unit 10 outputs a remaining charge amount display output command signal to the GPU 68 based on the remaining charge amount data received by the BT communication module 79, and displays the remaining charge amount in the battery 83 on the image display unit 101 of the monitor device 100 through digital readout, graphical representation, or character representation (Step S31). Furthermore, display regarding the remaining charge amount may be a warning for charge deficiency that is displayed only when the remaining charge amount falls below a predetermined threshold. Note that display regarding the remaining charge amount in the battery is preferably superimposed on the screen of the application program in execution. In this case, provision of information regarding the remaining charge amount in the battery to the application program side allows the application program to display the information thereof. Furthermore, displaying the remaining charge amount in the battery may be concluded by fulfilling a preset condition (e.g., predetermined input or passing of a predetermined time period).

As a result, the player may view the remaining charge amount in the battery 83 on the image display unit 101 of the monitor device 100 at arbitrary timings. In other words, the player may arbitrarily and easily recognize that the remaining charge amount has decreased and that transmission and reception of information through BT communication may be difficult.

In such a case, the player then establishes a USB connection. When the USB connection is established, upon completion of predetermined communication preparation, unique IDs are transmitted between the controllers 20 and the console main unit 10, and the console main unit 10 then conducts the same processing as in Step S21-1 of FIG. 9 (Step S32-1). Namely, under the condition that registration and correspondence of the unique IDs received by the wired and wireless controllers is completed, communication is switched from BT communication to USB communication. Since the correspondences of the unique IDs and virtual controller Nos. are preserved before and after this switching, the player may continue to execute the application program using the same controller 20 as is. Furthermore, when what is displayed on the image display unit 101 of the monitor device 100 before establishment of a USB connection is a warning for charge deficiency, it is deleted after the USB connection is established. Similarly, the controllers 20 also determine whether the unique IDs received by the console main unit 10 are registered in the sub-memory 91 (Step S32-2).

During a USB connection, the console main unit 10 supplies driving power to the controller 20 and charges the battery 83 (Step S33). Even when charging the battery 83, the CPU 81 of the controller 20 periodically calculates the remaining charge amount in the battery 83, and the USB communication module 88 transmits every time data thereof to the console main unit 10.

In the console main unit 10, the GPU 68 renews and displays a digital readout or the like of the remaining charge amount in the battery 83 based on the remaining charge amount data received by the USB communication module 78 (Step S34).

The player may easily recognize that the remaining charge amount has increased and transmission and that reception of information through BT communication is possible over an extended time period by viewing the display regarding the remaining charge amount in the battery 83 on the image display unit 101 of the monitor 100.

The player may also restore to the BT communication by canceling the USB connection as needed.

Note that in this embodiment, displaying the remaining charge amount in the battery is conducted if the predetermined input of simultaneously depressing the home button 52 and the circle marked button 45 of the controller 20 is made; however, displaying the same may be conducted without such a predetermined input. Displaying the remaining charge amount in the battery may be carried out if the amount is below a predetermined threshold, for example.

[Description of RSSI Monitoring During BT Communication]

Figure 11:
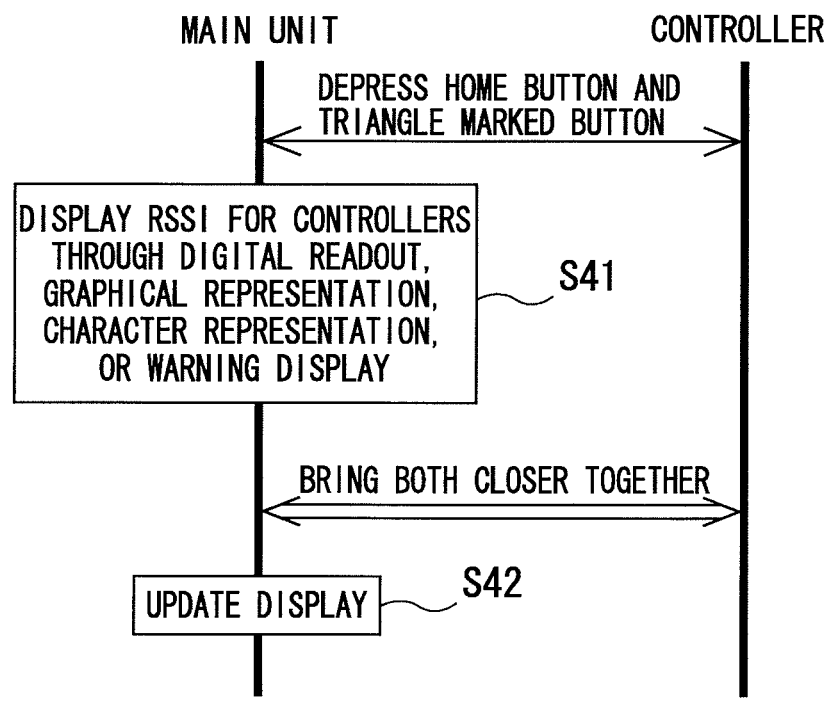
FIG. 11 is a time chart showing RSSI monitoring during BT communication.

The console main unit 10 periodically conducts RSSI monitoring, and periodically detects electric field intensity between the console main unit 10 and the controllers 20 during wireless communication, as shown in FIG. 11.

When the home button 52 and the triangle marked button 48 of the controller 20 stored with said virtual controller No. are depressed simultaneously while an application program associated with that virtual controller No. is in execution, and the console main unit 10 has received a specified processing execution command signal in conformity with this button operation, the console main unit 10 starts displaying the electric field intensity.

For displaying the detected electric field intensity, the GPU 68 displays the electric field intensity on the image display unit 101 of the monitor device 100 through digital readout, graphical representation, or character representation (Step S41). Furthermore, what is displayed regarding electric field intensity may be a warning for BT communication failure, which is displayed only when the electric field intensity falls below a predetermined threshold. Note that the display regarding the aforementioned electric field intensity is preferably superimposed on the screen of the application program in execution. In this case, provision of data of the electric field intensity to the application program side also allows an application program to display the electric field intensity. Furthermore, displaying the electric field intensity may be concluded by fulfilling a preset condition (e.g., predetermined input or passing of a predetermined time period).

The player may view the display regarding the electric field intensity on the image display unit 101 of the monitor device 100 at arbitrary timings. In other words, the player may arbitrarily and easily recognize that the electric field intensity has decreased and transmission and that reception of information through BT communication is difficult.

The above-mentioned inconvenience is eliminated by the player bringing the controller 20 closer to the console main unit 10. By handling the problem in this manner, the display regarding the electric field intensity on the image display unit 101 is updated, and the player may easily visually recognize that the electric field intensity is sufficient for proper BT communication.

Note that in this embodiment, displaying the electric field intensity is conducted if the predetermined input of simultaneously depressing the home button 52 and the triangle marked button 48 of the controller 20 is made; however, displaying the same may be conducted without such a predetermined input. Displaying the electric field intensity if the electric field intensity is below a predetermined threshold may be carried out, for example.

Furthermore, while the present invention is sued for the console main unit and its controllers according to the descriptions of the embodiments given above, it is not limited thereto.

The descriptions of the respective embodiments given above are merely examples. Therefore, the present invention is not limited to the respective embodiments given above, and it is needless to say that various changes may be made without departing from the spirit or scope of the present invention.

INDUSTRIAL APPLICABILITY

The present invention may be applied to an operation terminal operated by a user, and various information and telecommunications systems capable of wired and wireless communication between the operation terminal and an information processing unit.

The invention claimed is:

1. An information and telecommunications system, comprising an operation terminal operated by a user, and an information processing unit, which allows wired and wireless communication with the operation terminal, wherein the operation terminal comprises:
    a terminal side transmitting means for transmitting and receiving information to/from the information processing unit by wired communication or wireless communication; and
    a non-volatile terminal side terminal identification information storage means prestored with unique terminal identification information;

the information processing unit comprises:
    an information processing execution means for executing predetermined information processing;
    a console side transmitting means for transmitting and receiving information to/from the operation terminal;
    a non-volatile console side terminal identification information storage means stored with the terminal identification information by initial registration processing;
    a correspondence setting means for corresponding one of multiple virtual terminal numbers to terminal identification information received by the console side transmitting means, and associating the one virtual terminal number corresponded to the terminal identification information to the predetermined information processing; and
    a correspondence storage means stored with correspondence between the terminal identification information and the virtual terminal number; wherein the terminal side transmitting means transmits the terminal identification information stored in the terminal side terminal identification information storage means to the console side transmitting means by wired communication when starting communication with the console side transmitting means by wired communication; and the terminal side transmitting means transmits the terminal identification information stored in the terminal side terminal identification information storage means to the console side transmitting means by wireless communication when starting communication with the console side transmitting means by wireless communication, wherein the correspondence setting means determines whether the terminal identification information received by the console side transmitting means is stored in the console side terminal identification information storage means when starting communication, and when it has already been stored, associates the one virtual terminal number to the terminal identification information without initial registration processing, and when it is not yet stored, stores the received terminal identification information in the console side terminal identification information storage means in initial registration processing and then corresponds the one virtual terminal number to the terminal identification information, and wherein as the identification information received by the one of the wired and wireless communication has been associated to one of the multiple virtual terminal numbers, when the console side transmitting means receives the terminal identification information by the other of the wired and wireless communication, the correspondence setting means maintains the association between the terminal identification information and one virtual terminal number.

2. The information and telecommunications system of claim 1, wherein the terminal side transmitting means and the console side transmitting means only transmit and receive information through wired communication when both are in a wired connection, and transmit and receive information only through wireless communication when both are not in a wired connection.

3. The information and telecommunications system of claim 1, wherein the operation terminal comprises a battery for supplying driving power to the operation terminal itself during wireless communication, and a remaining charge amount detecting means for calculating the remaining charge amount in the battery;

the information processing unit comprises a console side display control means for performing display control of a console side display means integrally or separately provided with/from the information processing unit according to information processing conducted by the information processing execution means;

the information processing unit supplies driving power to the operation terminal via a wired connection in a state where the wired connection is established between the terminal side transmitting means and the console side transmitting means;

the terminal side transmitting means transmits information regarding the remaining charge amount in the battery calculated by the remaining charge amount detecting means to the console side transmitting means; and the console side display control means displays the remaining charge amount in the battery directly or indirectly on the console side display means based on the information regarding the remaining charge amount in the battery.

4. An information processing unit capable of communication with multiple operation terminals operated by users, comprising:

an information processing execution means for executing predetermined information processing;

a console side transmitting means for transmitting and receiving information to/from the operation terminals;

a non-volatile console side terminal identification information storage means stored with terminal identification information unique to the operation terminals by initial registration processing;

a correspondence setting means for corresponding one of multiple virtual terminal numbers to terminal identification information received by the console side transmitting means, and associating the one virtual terminal number corresponded to the terminal identification information to the predetermined information processing; and a correspondence storage means stored with correspondence between the terminal identification information and the virtual terminal number; wherein the console side transmitting means receives the terminal identification information stored in the operation terminals from said operation terminals by wired communication when starting communication with the operation terminals by wired communication;

the console side transmitting means receives the terminal identification information stored in the operation terminals from said operation terminals by wireless communication when starting communication with the operation terminals by wireless communication; and when the console side transmitting means has received the terminal identification information when starting communication from the operation terminals, the correspondence setting means determines whether the terminal identification information received by the console side transmitting means is stored in the console side terminal identification information storage means, and when it has already been stored by initial registration processing, associates the one virtual terminal number to the terminal identification information without initial registration processing, and when it is not yet stored, stores the received terminal identification information in the console side terminal identification information storage means in initial registration processing and then corresponds the one virtual terminal number to the terminal identification information, and wherein as the identification information received by the one of wired and wireless communication has been assigned to one of the multiple virtual terminal numbers, when the console side transmitting means receives the terminal identification information by the other of the wired and wireless communication, the correspondence setting means maintains the association between the terminal identification information and one virtual terminal number.

5. The information processing unit of claim 4, wherein the console side transmitting means only transmits and receives information to/from the operation terminals through wired communication when connected to the operation terminals through a wired connection, and only transmits and receives information through wireless communication when connected to the operation terminals through a wireless connection.

6. The information and telecommunications system according to claim 1, wherein the operation terminal further comprises:

a terminal side console identification information storage means stored with console identification information;

a console identification information storage control means;

a terminal side display means; and a terminal side display control means for performing display control for the terminal side display means, wherein the terminal side transmitting means receives unique console identification information for the information processing unit from the information processing unit, and receives a virtual terminal number corresponded to the terminal identification information by the information processing unit or information corresponding to the virtual terminal number from the information processing unit;

the console identification information storage control means stores the received console identification information in the terminal side console identification information storage means; and the terminal side display control means displays an identification display directly or indirectly representing the virtual terminal number on the terminal side display means when the terminal side transmitting means receives the virtual terminal number or information corresponding to the virtual terminal number.

7. The information and telecommunications system according to claim 1, wherein the terminal side transmitting means only transmits and receives information to/from the information processing unit through wired communication when connected to the information processing unit in a wired connection, and only transmits and receives information through wireless communication when connected to the information processing unit in a wireless connection.

* * * * *